（12） United States Patent
Matsui et al.

(10) Patent No.: US 6,738,807 B1
(45) Date of Patent: May 18, 2004

(54) VIRTUAL SPACE COMMUNICATION SYSTEM FOR EXECUTING COMMUNICATION AMONG COMPUTERS SHARING A VIRTUAL SPACE

(75) Inventors: Kazuki Matsui, Kawasaki (JP); Takashi Ohno, Kawasaki (JP); Akinori Iwakawa, Kawasaki (JP); Naohisa Kawaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/039,241

(22) Filed: Mar. 16, 1998

(30) Foreign Application Priority Data

Jun. 27, 1997  (JP) .............................. 9-172202

(51) Int. Cl.[7] .......................................... G06F 15/173
(52) U.S. Cl. ........................................ 709/223
(58) Field of Search ................ 709/224, 225, 709/226, 205, 223; 463/42; 707/103, 10

(56) References Cited

U.S. PATENT DOCUMENTS 5,005,122 A * 4/1991 Griffin et al. ............... 364/200
5,793,365 A * 8/1998 Tang et al. ................. 345/329
5,884,316 A * 3/1999 Bernstein et al. ........... 707/103
5,890,963 A * 4/1999 Yen ............................ 463/42

* cited by examiner

*Primary Examiner*—David Davis
(74) *Attorney, Agent, or Firm*—Staas & Halsey LLP

(57) ABSTRACT

A virtual space communication system includes a virtual space management computer which manages information regarding a virtual space, a plurality of client computers each of which receives information regarding the virtual space from the virtual space management computer and generates communication information used in the virtual space, each of the plurality of client computers having an object state changing unit for changing a state of an object included in the virtual space, and a communication management computer which intermediates communications regarding communication information and information representing change of a state of an object among the plurality of client computers sharing the virtual space. The virtual space communication system further comprises a changing unit for, when a state of an object is changed in one of the plurality of client computers, changing information of the virtual space managed by the virtual space management computer based on a changed state of the object.

16 Claims, 19 Drawing Sheets

FIG.9

| OBJECT NAME | OBJECT STATE MANAGEMENT SERVER ADDRESS |
|---|---|
| "OBJECT 1" | "OBJECT STATE MANAGEMENT SERVER 1" |
| "OBJECT 2" | "OBJECT STATE MANAGEMENT SERVER 2" |

FIG. 18

| USER ID NUMBER | USER NAME | CLIENT ADDRESS |
|---|---|---|
| USER ID NUMBER | USER NAME | CLIENT ADDRESS |

VIRTUAL SPACE COMMUNICATION SYSTEM FOR EXECUTING COMMUNICATION AMONG COMPUTERS SHARING A VIRTUAL SPACE

BACKGROUND OF THE INVENTION (1) Field of the Invention

The present invention generally relates to a virtual space communication system in which users of a plurality of computers connected via a network communicate (by voice and/or text) with each other in a virtual space shared by the computers, and more particularly to a virtual space communication system in which graphical objects (e.g., named as an "avatar") acting in the virtual space shared by a plurality of computers, in accordance with operations by users, are used so that the users communicate with each other via actions of the graphical objects.

(2) Description of the Related Art

Conventionally, the so-called virtual space communication system in which users of a plurality of computers, connected by a network, communicate with each other in a virtual space shared by the computers, has been proposed. This type of system is formed as shown in FIG. 1.

Referring to FIG. 1, computers 3(1) and 3(2) (hereinafter referred to as clients) which are used by users to communicate with each other in a virtual space are connected to a network. The network is connected with an object data server 1 (e.g., a WWW server) for supplying information regarding the virtual space and a communication server 2. The communication server 2 relays communication among the clients 3(1) and 3(2) and the object data server 1.

The information regarding the virtual space which should be supplied by the object data server 1 includes files (e.g., VRML) in which the virtual space (towns, rooms, parks and the like) are described and image data (CG data). The files in which the virtual space is described include information regarding attributes (positions, shapes, colors and the like) of objects forming the virtual space (existing in the virtual space).

In each of the clients 3(1) and 3(2) into which the information regarding the virtual space supplied from the object data server 1 via the network is down loaded, the same image of the virtual space is displayed. That is, the same virtual space is shared by the respective clients 3(1) and 3(2). Graphical objects, for example, named "avatars", which are assigned to the clients are displayed in the virtual space. The "avatars" act (move and/or speak) based on operations by users in the corresponding clients. The communication server 2 manages clients which access (share) the same virtual space so that data (positions, actions and the like) regarding the "avatars" and conversation sentences (character strings, voice and the like) which are input by operations in each client are transmitted to other clients via the communication server 2. As described above, the users of the respective clients communicate with each other via "avatars" in the virtual space shared by the clients.

Such a system may have a function for changing the attributes (positions, shapes, colors and the like) of the objects forming the virtual space based on operations in the clients. In this case, when a position of an object is changed in the client 3(1) as shown in FIG. 2 (for example, when a vehicle his moved in the virtual space), position change information of the object is supplied to the other client 3(i) sharing the virtual space via the communication server 2. Thus, in the other client 3(i), the position of the object is changed in the same manner as in the client 3(1) (the vehicle is moved in the virtual space).

In the system in which the attributes of the objects in the virtual space can be changed, for example, after the attribute of the object is changed in the clients 3(1) and 3(i), the other client 3(2) may access the virtual space, as shown in FIG. 2. In such a case, although the attribute of the object has been changed, information regarding the virtual space in which the attribute of the object has not yet changed is down loaded from the object server 1 into the other client 3(2). Thus, the virtual space shared by the clients 3(1) and 3(i) differs from that accessed by the other client 3(2).

SUMMARY OF THE INVENTION

Accordingly, a general object of the present invention is to provide a novel and useful virtual space communication system in which the disadvantages of the aforementioned prior art are eliminated.

A specific object of the present invention is to provide a virtual space communication system in which after the attribute of the object in the shared virtual communication is changed, another user can always participate in the communication using the virtual space in which the attribute of the object has been changed.

The above objects of the present invention are achieved by a virtual space communication system comprising: a virtual space management computer which manages information regarding a virtual space; a plurality of client computers each of which receives information regarding the virtual space from the virtual space management computer and generates communication information used in the virtual space, each of the plurality of client computers having object state changing means for changing a state of an object included in the virtual space; and a communication management computer which intermediates communications regarding communication information and information representing change of a state of an object among the plurality of client computers sharing the virtual space, wherein the virtual space communication system further comprises changing means for, when a state of an object changed in one of the plurality of client computers, changing information of the virtual space managed by the virtual space management computer based on a changed state of the object.

In the system according to the present invention as described above, when the state of an object is changed in one of the plurality of client computers, the change of the state of the object is reflected on the information regarding the virtual space managed by the virtual space management computer. Thus, in a client computer which receives the information regarding the virtual space from the virtual space management computer after the state of the object is changed, communication information can be generated in the virtual space including the object whose state has been changed. That is, according to the present invention, another user can always join the virtual space on which the state of the object having the changed attribute is reflected after the attribute of the object is changed.

The object is an element of the virtual space. The state of the object may include attributes regarding the state, such as a position in the virtual space, a shape, a color and the like.

The communication information may include various kinds of information, such as graphical images (an object named as an avatar), conversation scripts and voices, communicated among the client computers.

In order to be able to directly change the information regarding the virtual space, the above system may be formed so that the changing means has change informing means for informing the virtual space management computer of state change information indicating that a state of an object has been changed in one of the plurality of client computers, and virtual space changing means, provided in the virtual space management computer, for changing the information regarding the virtual space based on the state change information.

In this system, the virtual space management computer is directly informed of the state of the object which has been changed in one of the plurality of client computers. In the virtual space management computer, the information of the virtual space managed thereby is then changed.

In order to be able to easily change the information regarding the virtual space in the virtual space management computer, the above system may be formed so that the virtual space management computer has an object state table indicating states of respective objects forming the virtual space, and wherein the virtual space changing means has table rewriting means for rewriting the state of an object in the object state table based on the informed state change information.

In this system, due to rewriting the object state table in the virtual space management computer, the information regarding the virtual space can be changed.

In order to be able to accurately reflect information of the changed object on the information regarding the virtual space in a case where there is a plurality of computers which are suppliers of the information regarding the virtual space, the above system may be formed so that the virtual space management computer is formed of a plurality of management computers, the virtual space communication system further comprising means for managing a relationship between objects and the plurality of management computers which manage virtual spaces including the objects, wherein when the state of an object is changed in one of the plurality of client computers, information regarding a virtual space managed by a management computer being changed, the management computer, corresponding to the object whose state is changed, being decided based on the relationship managed by the means.

In this system, when the state of the object is changed in one of the plurality of client computers, a management computer which manages a virtual space including the changed object can be easily identified. The information regarding the virtual space managed by the identified management computer is then changed.

In order to able to efficiently inform the management computer, managing the virtual space including the changed object, of the change of information, the above system may be formed so that the means for managing the relationship between the objects and the plurality of management computers which manage the virtual spaces is provided in the communication management computer, wherein when the communication management computer receives from one of the plurality of client computers information indicating that the state of the client has been changed, the communication management computer informs the management computer, based on the relationship managed by the means, that the state of the object has been changed.

In this system, when the state of the object is changed in one of the plurality of client computers, other client computers are informed of this matter via the communication management computer. Thus, even if the one of the plurality of client computer does not inform other systems of the change of the state of the object, the communication management computer informs a corresponding management computer of the change of the state of the object.

In order to be able to always obtain at any time the information regarding the virtual space in which objects have been changed, the above system may be formed so as to include change informing means for, after the information regarding the virtual space managed by the virtual space management computer is changed, informing all client computers, sharing the virtual space, of the changed information.

In this system, the information regarding the virtual space which has been changed is always supplied to the client computers sharing the virtual space.

In order to be able to assign identification information which is unique in the system to an object generated in one of the plurality of client computers, the above system may further comprise identification information generating means for generating identification information identifying an object when the object is generated in one of the plurality of client computers, the identification information being unique in the system.

In order to be able to allow only a user having authority to change the state of the object, the above system may further comprise means for managing users having authorities based on which of the respective objects forming the virtual space is changed; and means for, when one of the plurality of client computers requests to change an object, determining whether a user of the one of the plurality of client computers is identical to a user who is managed by the means as a user having an authority to change the object, wherein when both the users are identical to each other, the information regarding the virtual space managed by the virtual space management computer is changed.

DESCRIPTION OF THE DRAWINGS

Other objects, features and advantages of the present invention will be apparent from the following description when read in conjunction with the accompanying drawings, in which:

FIG. 9 is a diagram illustrating an example of an object state management server address table;

FIG. 18 is a diagram illustrating an example of a user information table; and

DESCRIPTION OF THE PREFERRED EMBODIMENTS

A description will be given of a virtual communication system according to an embodiment of the present invention.

Figure 1:
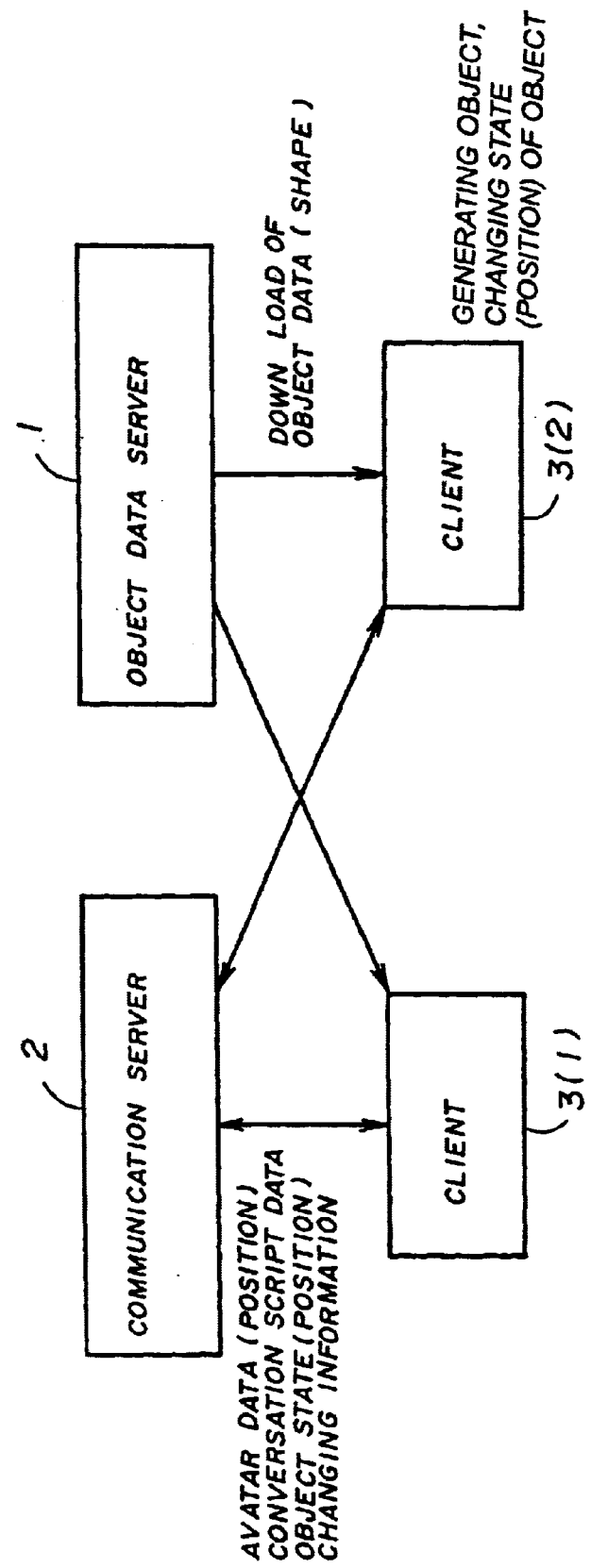
FIG. 1 is a block diagram illustrating a functional structure of a conventional system.
Figure 2:
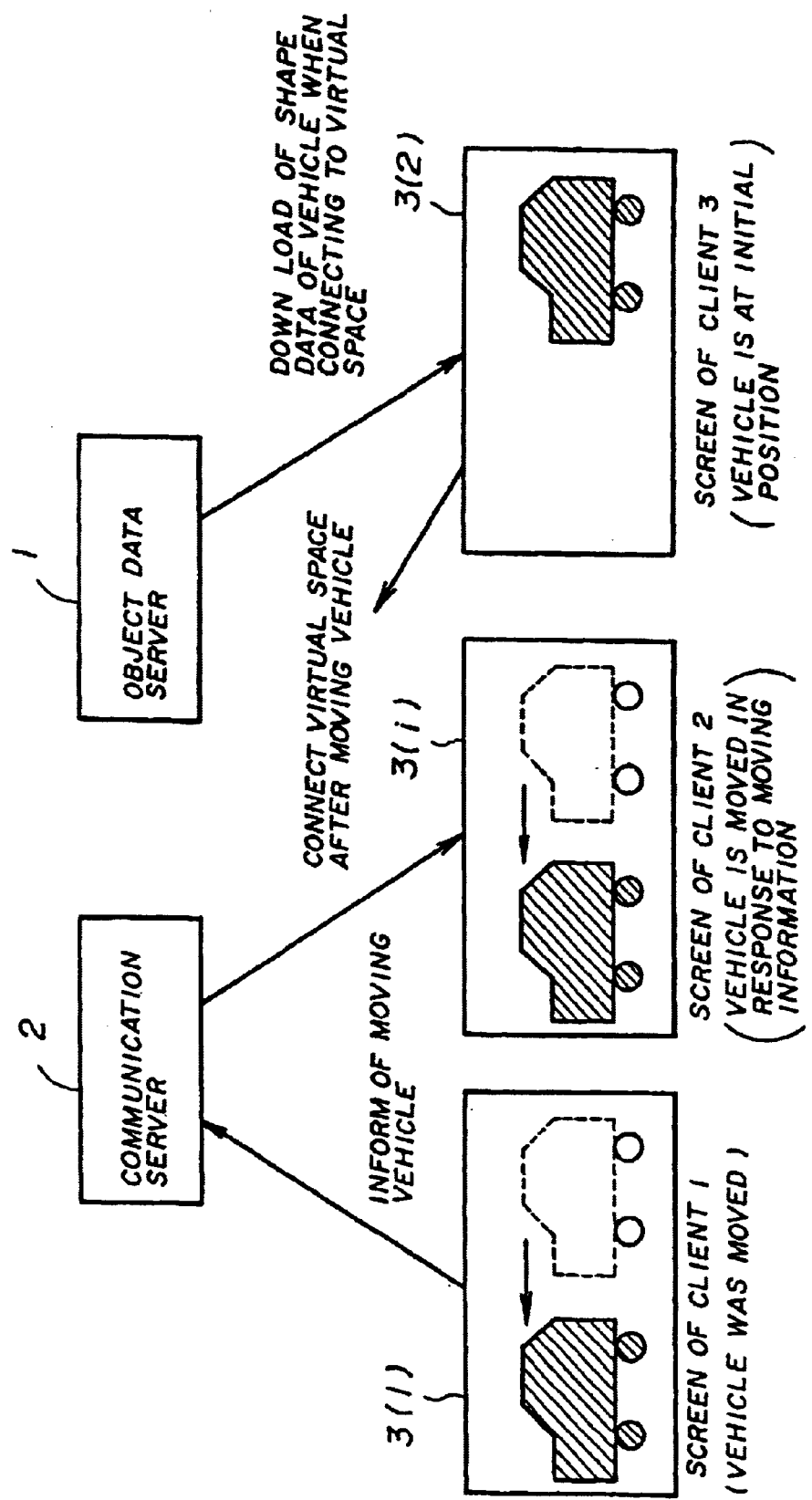
FIG. 2 is a diagram illustrating an example of a state of a virtual space formed in respective clients of the conventional system.
Figure 3:
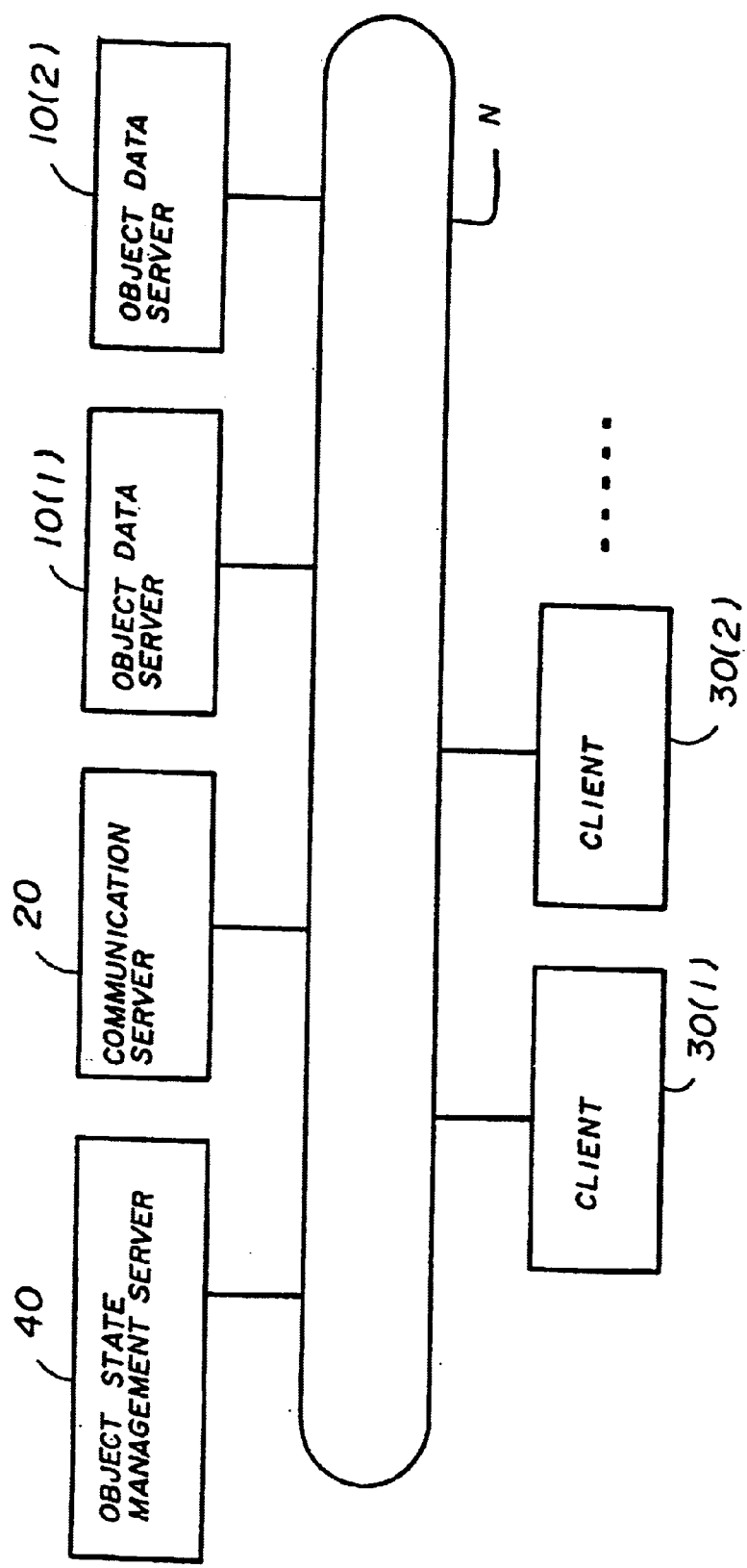
FIG. 3 is a block diagram illustrating a constitution of a virtual space communication system according to an embodiment of the present invention.

A virtual space communication system according to an embodiment of the present invention is formed as shown in FIG. 3.

Referring to FIG. 3, computers (clients) 30(1), 30(2), ... which are used by users communicating with each other in a virtual space are connected to a network N (LAN, the internet and the like). The network N is further connected with object data servers 10(1) and 10(2) (e.g., WWW servers), a communication server 20 and an object state management server 40.

The object data servers 10(1) and 10(2) manage information regarding the virtual space which should be supplied to the respective clients 30(1), 30(2), ..., in the same manner as those in the conventional case. The object state management server 40 manages information regarding the virtual space and state attributes (positions, shapes, colors and the like) of objects forming the virtual space. The communication server 20 relays data communication among the respective clients 30(1), 30(2), ... and data communication between each of the clients 30(1), 30(2), ... and the object management server 40. Thus, in this system, the information regarding the virtual space can be supplied to the respective clients 30(1), 30(2), ... from the respective object data server 10(1) and 10(2) and the object management server 40.

In the system as described above, when the information regarding the virtual space is down-loaded into the client 30(1) and 30(2) from one of the object data servers 10(1) and 10(2) and the object state management server 40, the virtual space is shared by the clients 30(1) and 30(2) in the same manner as in the conventional system. The data communication regarding actions and conversations of "avatars" between the respective clients 30(1) and 30(2) is relayed by the communication server 20, so that the users communicate with each other via the "avatars" in the virtual space displayed on a screen of each of the clients 30(1) and 30(2).

Figure 4:
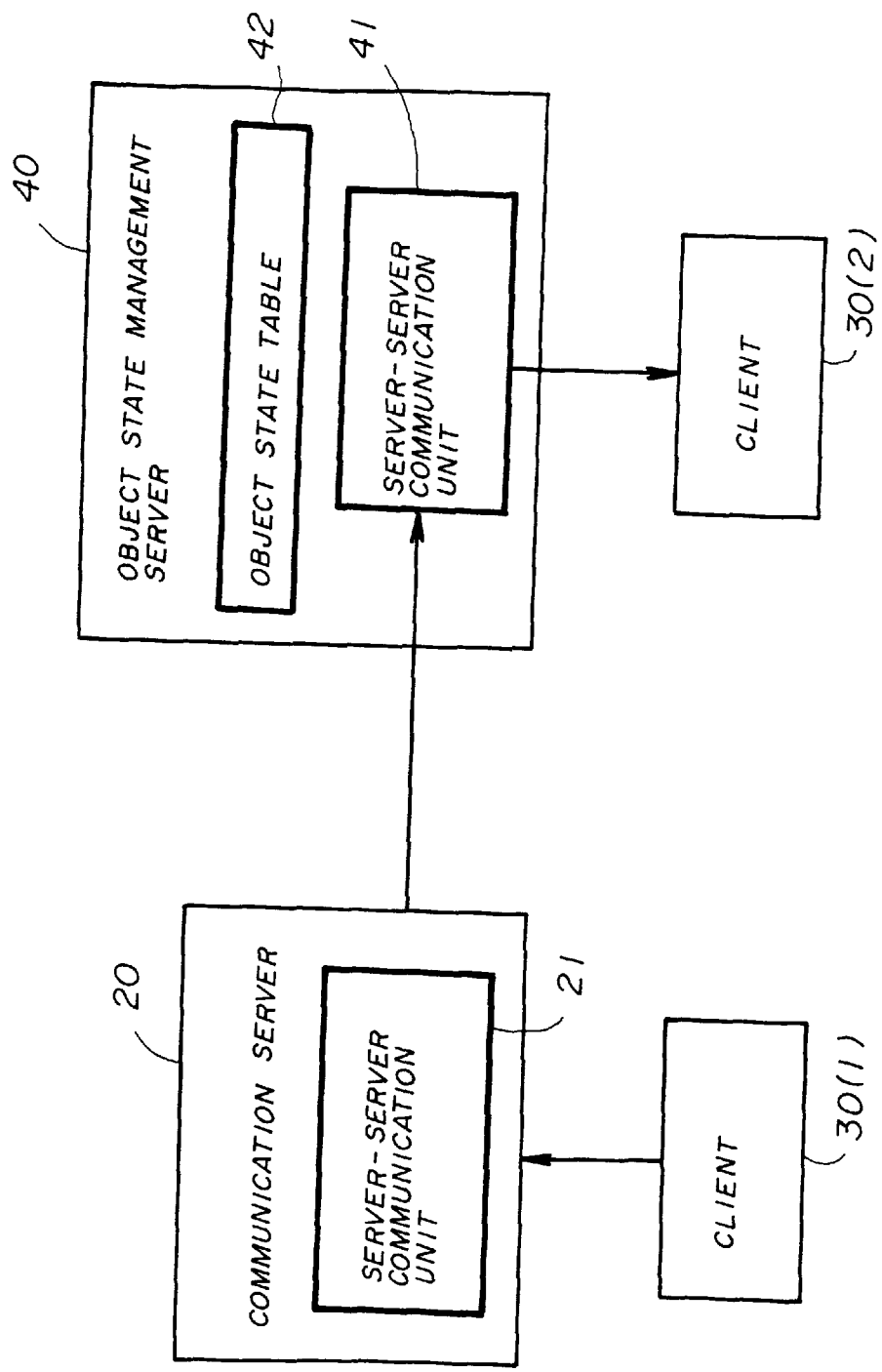
FIG. 4 is a block diagram illustrating a first example of the functional structure of the system shown in FIG. 3.

Further, the communication server 20 and the object state management server 40 have a functional structure as shown in FIG. 4.

Referring to FIG. 4, the communication server 20 has a server-server communication unit 21. The server-server communication unit 21 has data communication with each of the clients and the object state management server 40 via the network N. The object state management server 40 has a server-server communication unit 41 and an object state table 42. The server-server communication unit 41 has data communication with the communication server 20 and each of the clients via the network N. The object state table 42 indicates state attributes (positions, shapes, colors and the like) of objects forming the virtual space.

Figure 5:
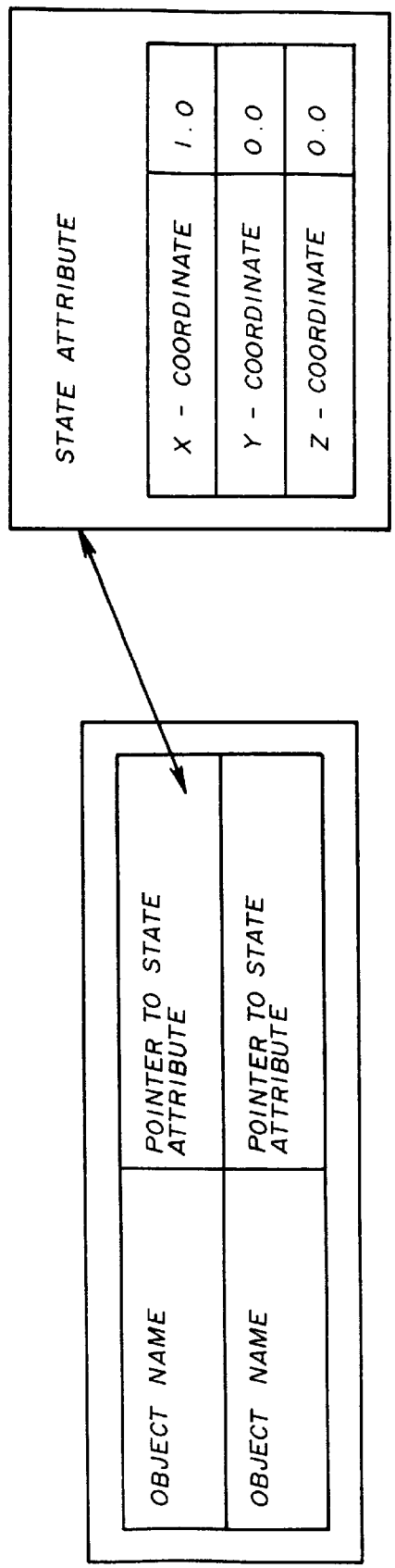
FIG. 5 is a diagram illustrating an example of an object state table.

The object state table 42 is formed as shown in FIG. 5. That is, the relationship between names (character strings of the names) of objects forming the virtual space and pointer values representing positions at which the state attributes of objects identified by the names are stored in a memory is indicated in the object state table 42 (see FIG. 5 (a)). Further, state attribute data (e.g, position data X, Y and Z) is stored in a memory area specified by the pointer value (see FIG. 5(b)).

In such a system, the information regarding the virtual space from the object state management server 40 is down-loaded into the client 30(1) so that the client 30(1) and other clients share the virtual space. When the user of the client 30(1) changes the attribute (e.g. the position) of an object in the virtual space, a process is executed in accordance with a procedure as shown in FIG. 6.

Figure 6:
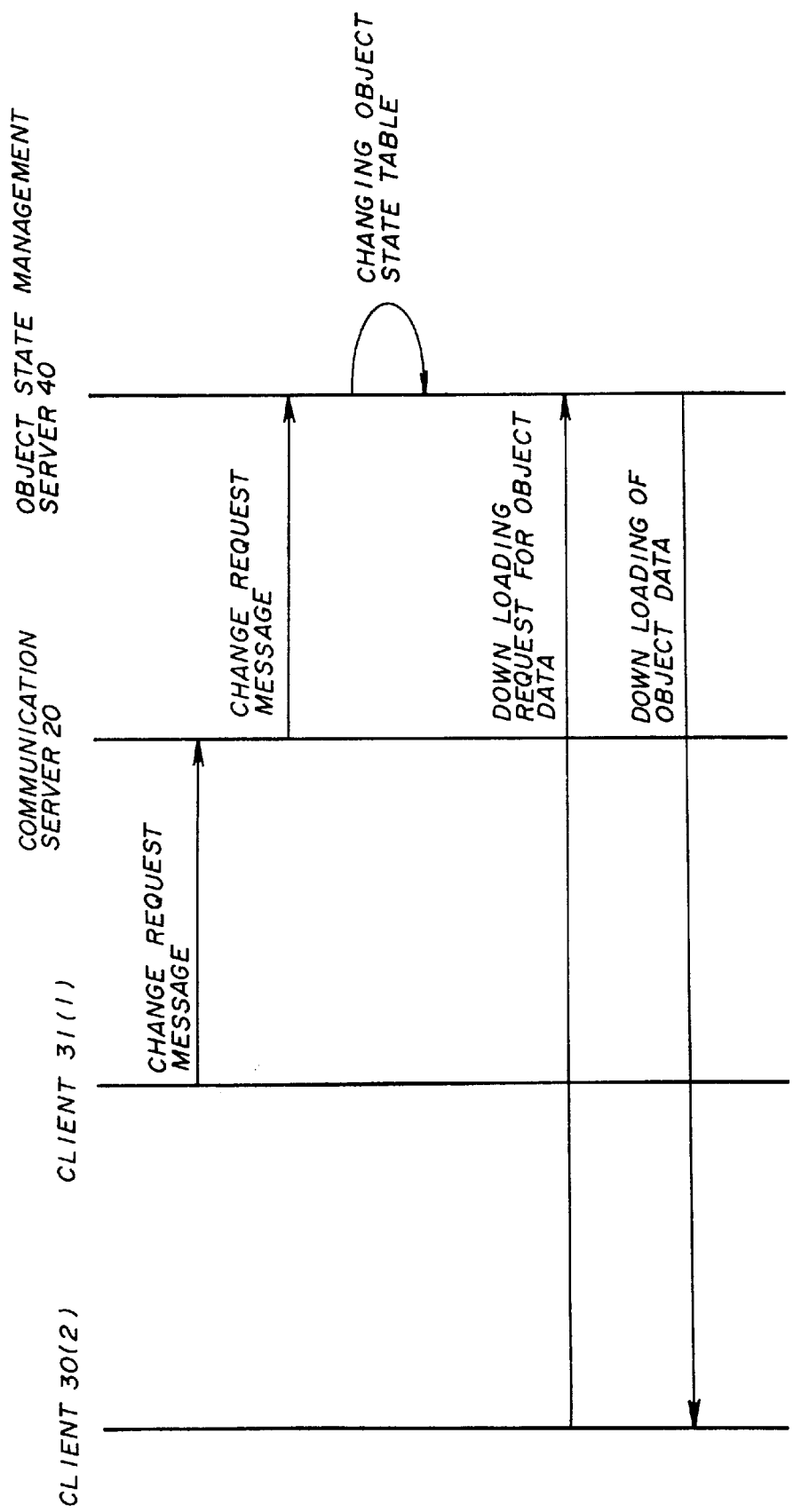
FIG. 6 is a flowchart illustrating a procedure of a process in the first example of the functional structure of the system.

Referring to FIG. 6, in accordance with input operations of the user, a change request message for changing the attribute, for example, a position of an object is transmitted from the client 30(1) to the communication server 20. The change request message for changing the position of the object is formed, for example, of a position change command ID number, a name of the object and position data (X, Y and Z coordinates).

When the server-server communication unit 21 of the communication server 20 receives the change request message from the client 30(1), the change request message is forwarded to the server-server communication unit 41 of the object state management server 40. In the object state management server 40, an updating process for updating the object state table is carried out based on the position change command ID number included in the received change request message.

In the updating process, the position data, corresponding to the name of the object included in the change request message, in the object state table (see FIG. 5b (a) and (b)) is changed to the position data included in the change request message.

When the change request message is forwarded from the communication server 20 to the object state management server 40, a change request message having the same contents as the above change request message is transmitted from the communication server 20 to other clients sharing the same virtual space as the client 30(1) (not shown in FIG. 6). As a result, in all the other clients sharing the same virtual space, the position of the object is changed in the same manner as the position of the object in the client 30(1).

After the position of the object is changed in all the clients sharing the same virtual space as described above, for example, the client 30(2) requests that the information regarding the virtual space is down-loaded from the object state management server 40 to the client 30(2) so that the user of the client 30(1) participates in the virtual space ("DOWN LOAD REQUEST OF OBJECT DATA" in FIG. 6). In this case, the object state management server 40 obtains the state attribute data (including the position data) of the respective objects with reference to the object state table which has been updated as described above. The information regarding the virtual space including the state attribute data of the respective objects is transmitted to the client 30(2) which has requested the information.

Figure 7:
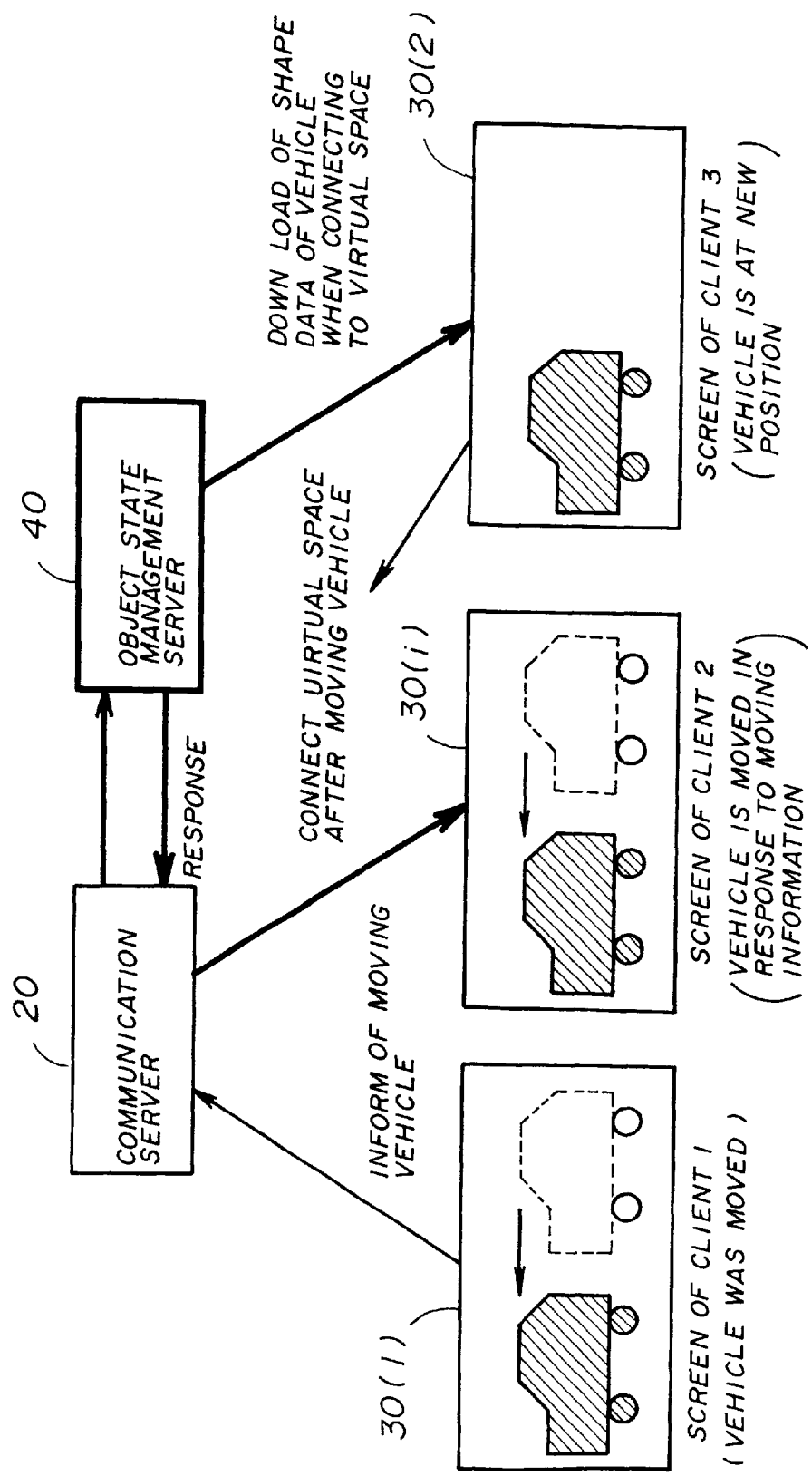
FIG. 7 is a diagram illustrating a state of a virtual space in each client in the first example of the functional structure of the system.

In the client 30(2) which receives the information regarding the virtual space, the image of the virtual space is displayed on the screen based on the received information. As a result, as shown in FIG. 7, in a case where the client 30(2) accesses the virtual space after the attribute of the object (the position of the vehicle) is changed in the clients 30(1) and 30(i), an image of the virtual space in which the attribute of the object (the position of the vehicle) has been changed is displayed on the screen of the client 30(2). Thus, even if the virtual space is accessed at any time, all the clients sharing the virtual space have each of the objects in the same state.

A plurality of object state management servers may be connected to the network N to supply information regarding different virtual spaces to the respective clients. In this case, the system is formed as shown in FIG. 8.

Figure 8:
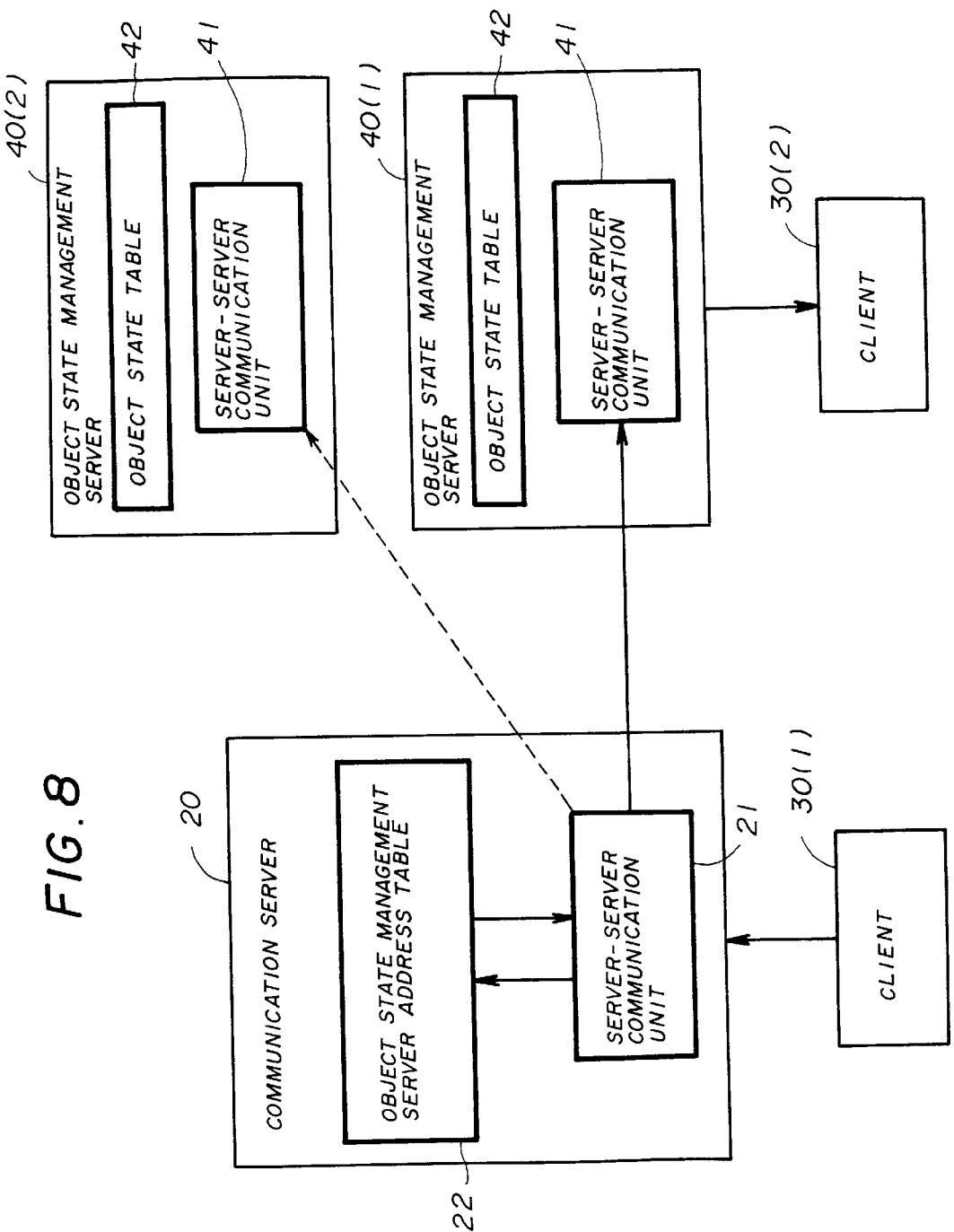
FIG. 8 is a block diagram illustrating a second example of the functional structure of the system shown in FIG. 3.

Referring to FIG. 8, the communication server 20 has the server-server communication unit 21 for relaying the communication between the clients and the communication between each of the clients and each of the object state management server 40(1) and 40(2). The communication server 20 further has an address table 22. The address table 22, as shown in FIG. 9, describes a relationship between a name of an object and an object state management server managing a virtual space including the object.

Each of the object state management server 40(1) and 40(2) has the server-server communication unit 4 and the object state table (see FIG. 5) in the same manner as the object state management server 40 described above.

Figure 10:
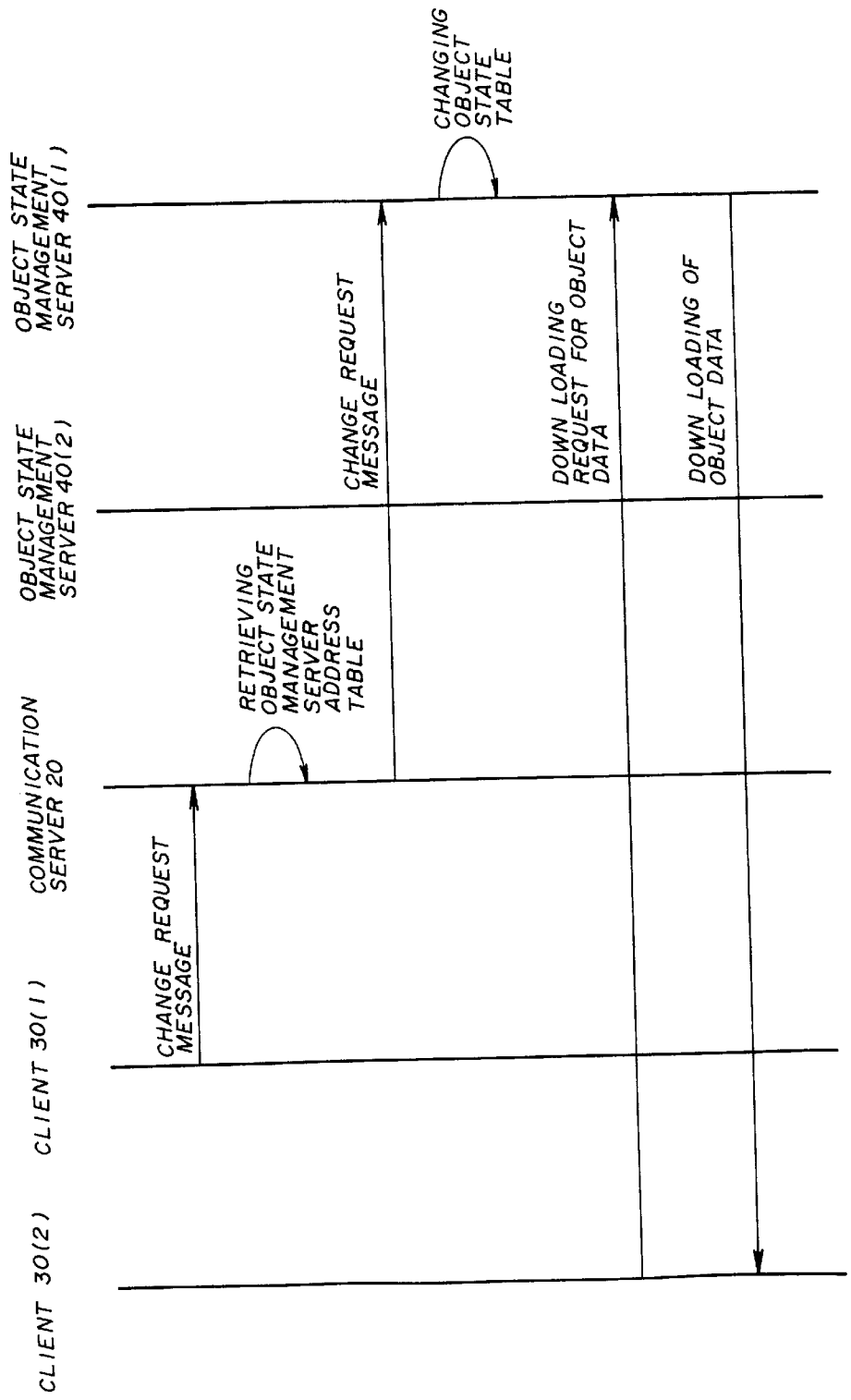
FIG. 10 is a flowchart illustrating a procedure of a process in the second example of the functional structure of the system.

In such a system, when a user of the client 30(1) carries out operations to change the state attribute (the position) of the object in the virtual space, a process is performed in accordance with a procedure as shown in FIG. 10.

Referring to FIG. 10, the change request message for changing the state (the position) of the object is transmitted from the client 30(1) to the communication server 20 in the same manner as in the above case. In the communication server 20 which receives the change request message, the object state management server corresponding to the name of the object included in the change request message is retrieved from the address table 22. The change request message is transmitted from the server-server communication unit 21 of the communication server 20 to the object state management server (e.g., 40(1)) obtained in the retrieving result.

In the object state management server 40(1) which receives the change request message, the state attribute (the position) of the object in the object state management table 42 is changed based on the change request massage. In addition, the communication server 20 forwards the change request message also to other clients to which the information regarding the same virtual space as the client transmitting the change request message is supplied. As a result, in the other client which receive the change request message, the state attribute (the position) of the object in the virtual space is changed in accordance with the change request message.

In such a state, a request for down-loading the information regarding the virtual space (an object data down loading request) is supplied from another client 30(2) to the object state management server 40(1) in order that a user of the client 30(2) joins in the virtual space. The object state management server 40(1) then refers to the object state table 42 which has been updated as described above and transmits to the client 30(2) the information regarding the virtual space including the state attribute data which has been changed, in the same manner as in the above case. That is, the user of the client 30(2) can join in the virtual space in which the object is in changed state.

In the system as describe above, in a case where the request for down-loading the information regarding the virtual space is supplied from a client to the object state management server 40 until a time at which the object state table of the object state management server 40 is actually rewritten after the request for changing the sate of an object is issued from another client, the information regarding the virtual space which has not yet changed is supplied to the client. In order to be capable of supplying the information regarding the virtual space which has been changed to the client in the above case, the system can be formed as shown in FIG. 11.

Figure 11:
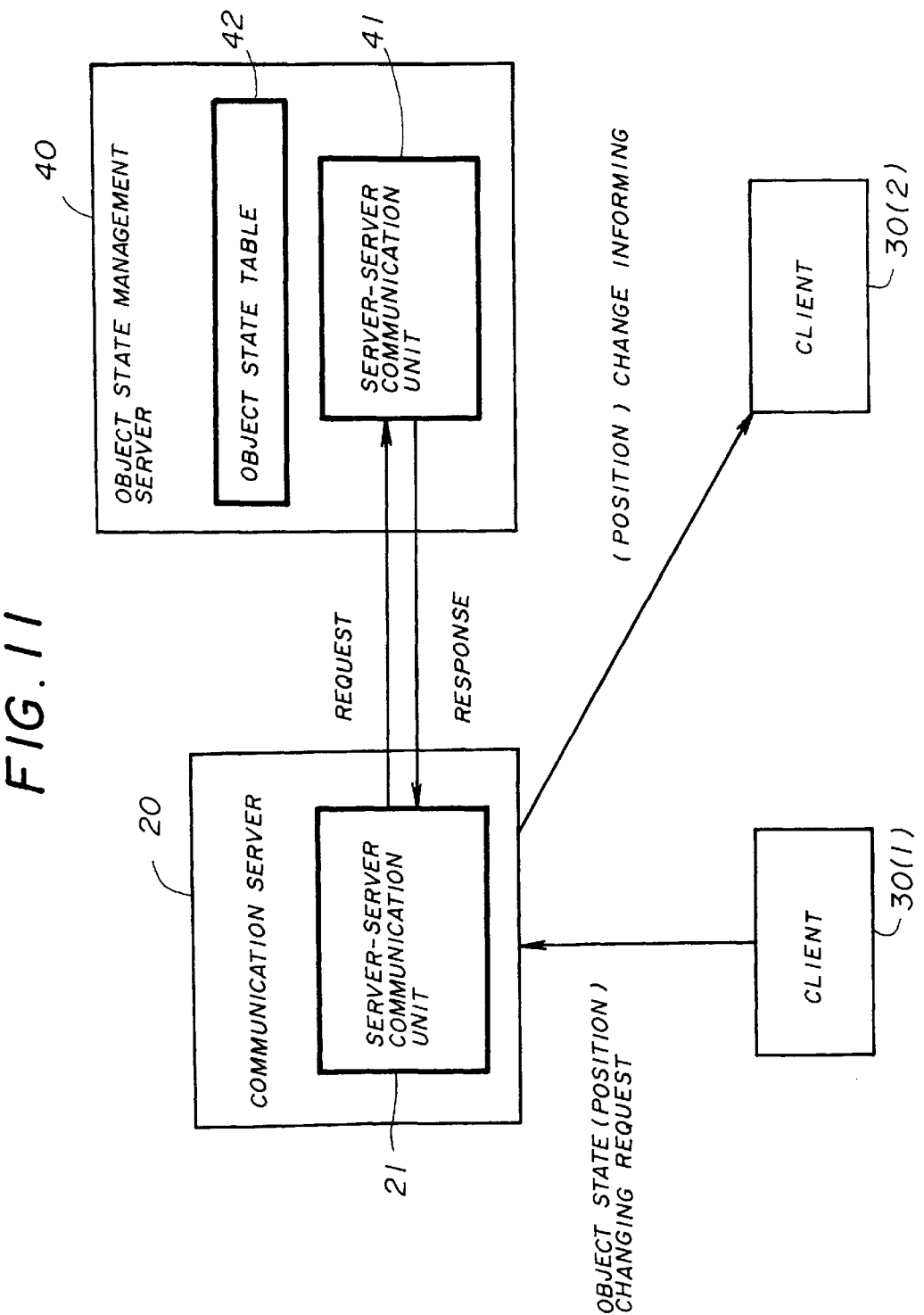
FIG. 11 is a block diagram illustrating a third example of the functional structure of the system shown in FIG. 3.

Referring to FIG. 11, the communication server 20 has the server-server communication unit 21 land the object state management server 40 has the server-server communication unit 41 and the object state table 42, in the same manner as those shown in FIG. 4. In such a system, when a user of a client 30(1) carries out operations to change the state attribute (a position) of an object in the virtual space, the process is performed in accordance with a procedure as shown in FIG. 12.

Figure 12:
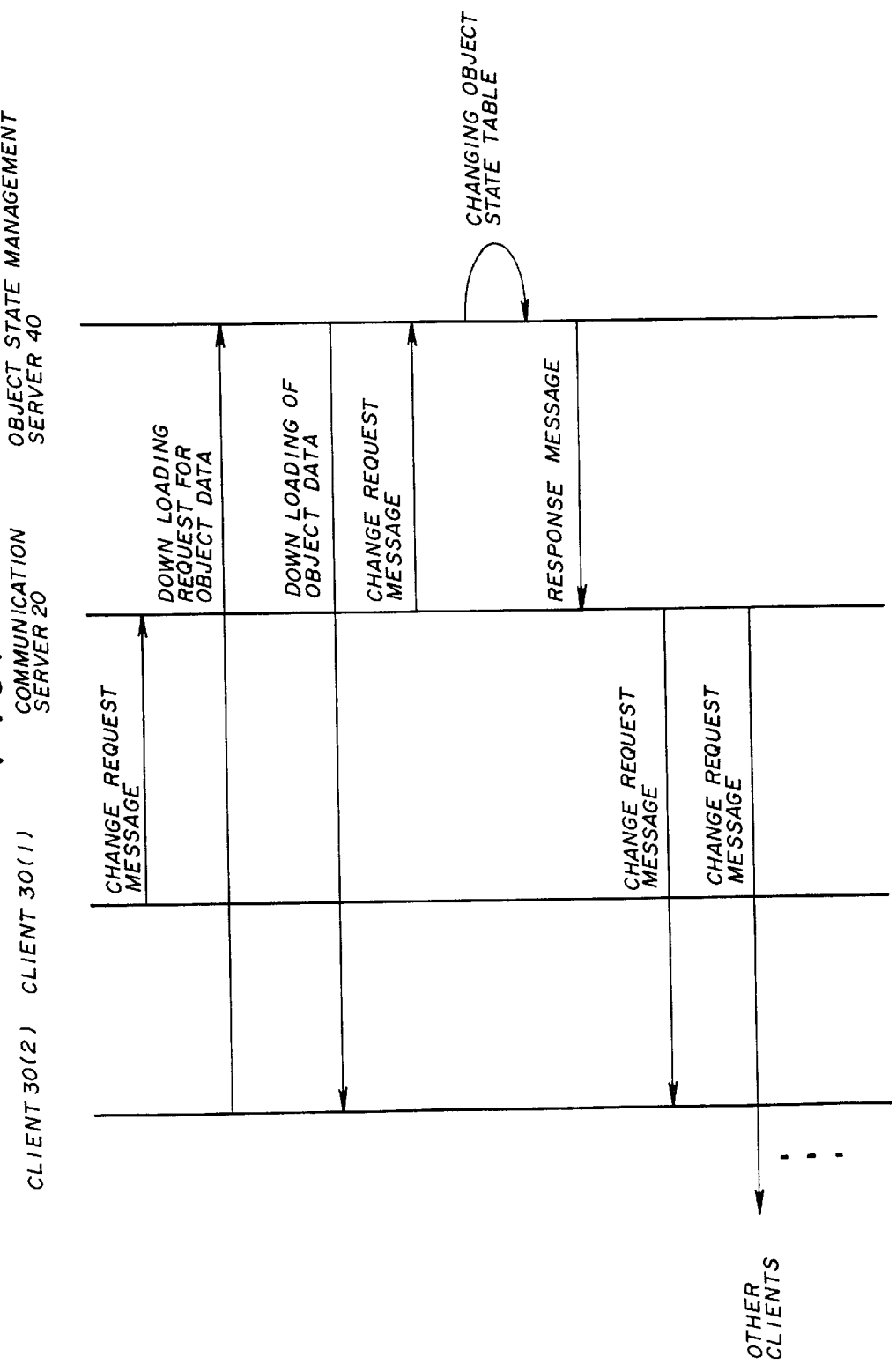
FIG. 12 is a flowchart illustrating a procedure of a process in the third example of the functional structure of the system.

Referring to FIG. 12, the change request message for changing the state (the position) of the object is transmitted from the client 30(1) to the communication server 20 in the same manner as in the above case. Immediately after this, the request for down-loading the information regarding the virtual space is supplied from another client 30(2) to the object state management server 40. The information regarding the virtual space is then transmitted from the object state management server 40 to the client 30(2). In this state, the user of the client 30(2) can join the virtual space. The change of the state of the object which was performed in the client 30(1) is not reflected on the information regarding the virtual space which is received by the client 30(2).

After this, the communication server 20 forwards to the object state management server 40 the change request message for changing the state of the object which has been received from the client 30(1). In the object state management server 40 which receives the change request message, the contents of the object state table 40 are changed based on the change request message in the same manner as in the above case. After the contents of the object state table 41 is changed as described above, a response message is transmitted from the object state management server 40 to the communication server 20. The response message includes, for example, a response command ID number and a changing result (a success ID or a fail ID).

After the communication server 20 receives the response message from the object state management server 40 and detects that the state of the object has be en changed, the communication server 20 transmits the change request message which was received from the client 30(1) to all other clients, including the client 30(2), sharing the same virtual space as the client 30(1).

According to the process as described above, the virtual space having the same state of each object can be shared by a plurality of clients.

In a case where a new object is made in the virtual space by a client, it is necessary to always assign a unique ID to the new object. To satisfy such a request, the system can be formed as shown in FIG. 13.

Figure 13:
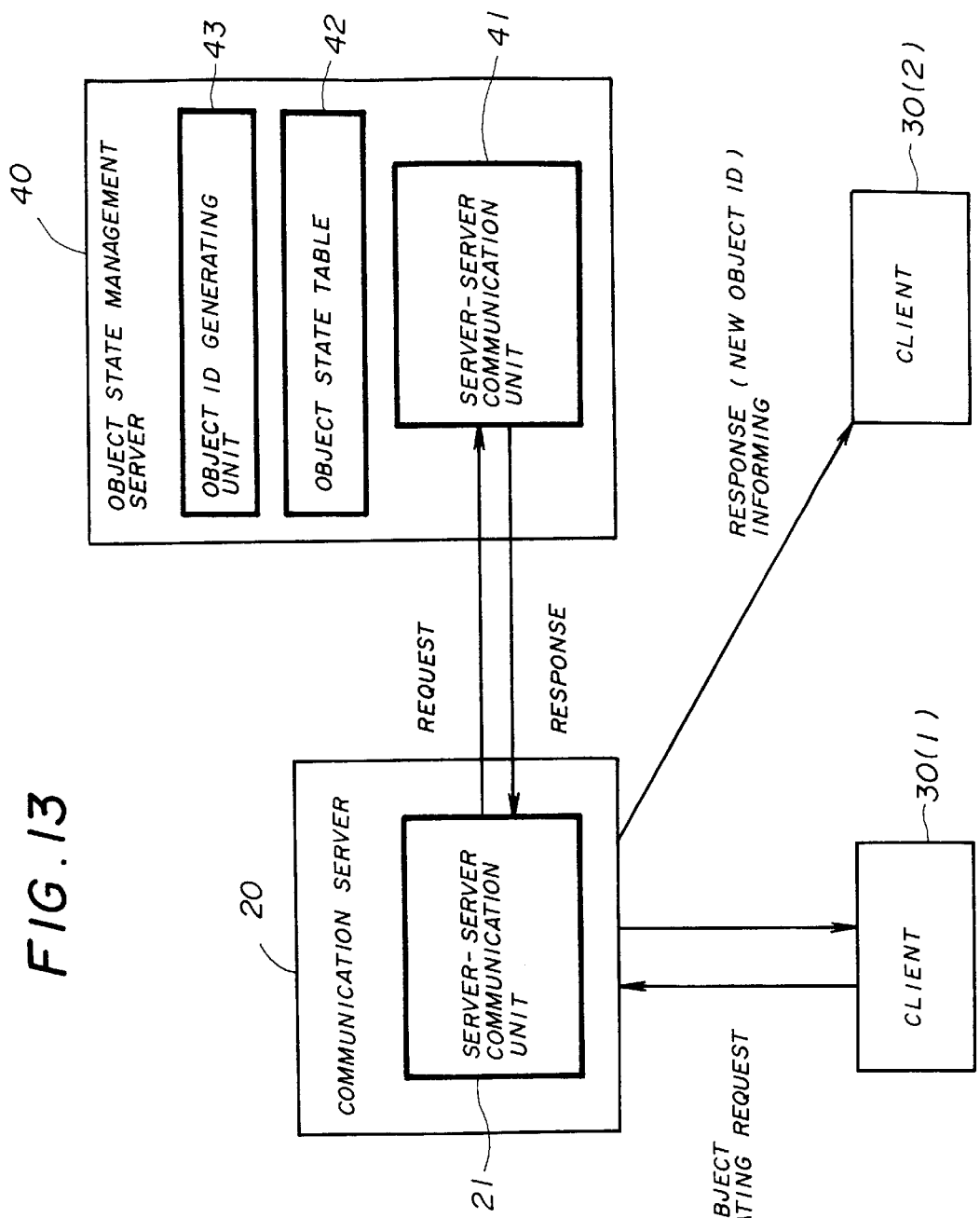
FIG. 13 is a block diagram illustrating a fourth example of the functional structure of the system shown in FIG. 3.

Referring to FIG. 13, the communication server 20 has the server-server communication unit 21 in the same manner as in the above case. The object state management server 40 has the server-server communication unit 41 and the object state table 42 in the same manner as in the above case and further has an object ID generating unit 43.

Figure 14:
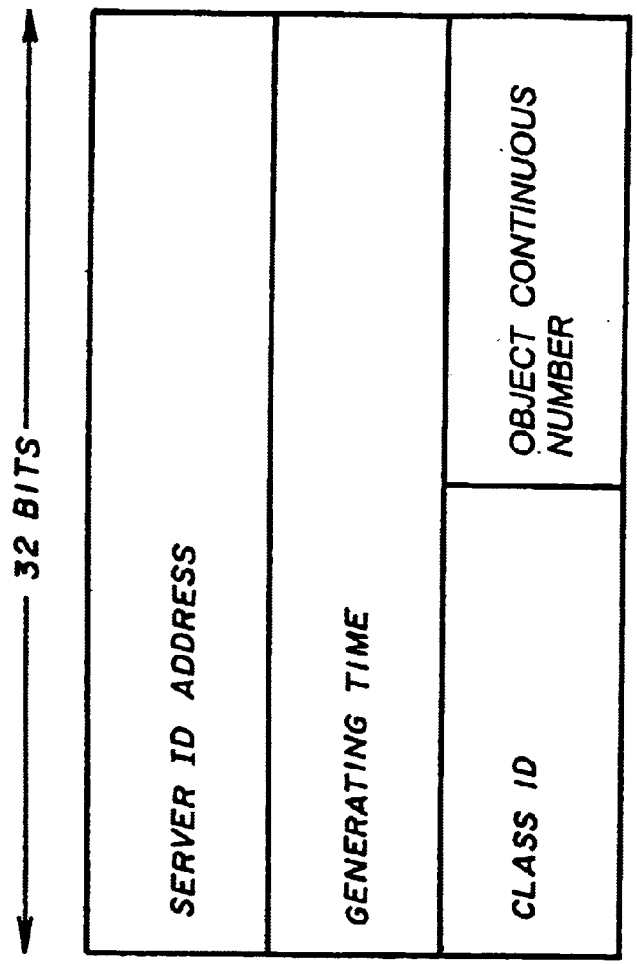
FIG. 14 is a diagram illustrating an example of a format of an object ID.

The object ID generating unit 43 generates an object ID having a format as shown in FIG. 14. That is, the object ID is formed of a "server IP address", a "generating time", a "class ID number" and an "object continuous number". The "server IP address" identifies the object state management server 40. The "generating time" represents a time at which the object ID is generated. The "class ID number" represents a type of generated object (e.g., a vehicle, a house, a bridge or the like). The "object continuous number" is incremented by one every time an object is generated. The "object continuous number" starts from "0" and returns to "0" when reaching the maximum value represented by 16 bits.

According to the object ID as describe above, an object ID which is unique in the system can be assigned to an object generated in each client.

Figure 16:
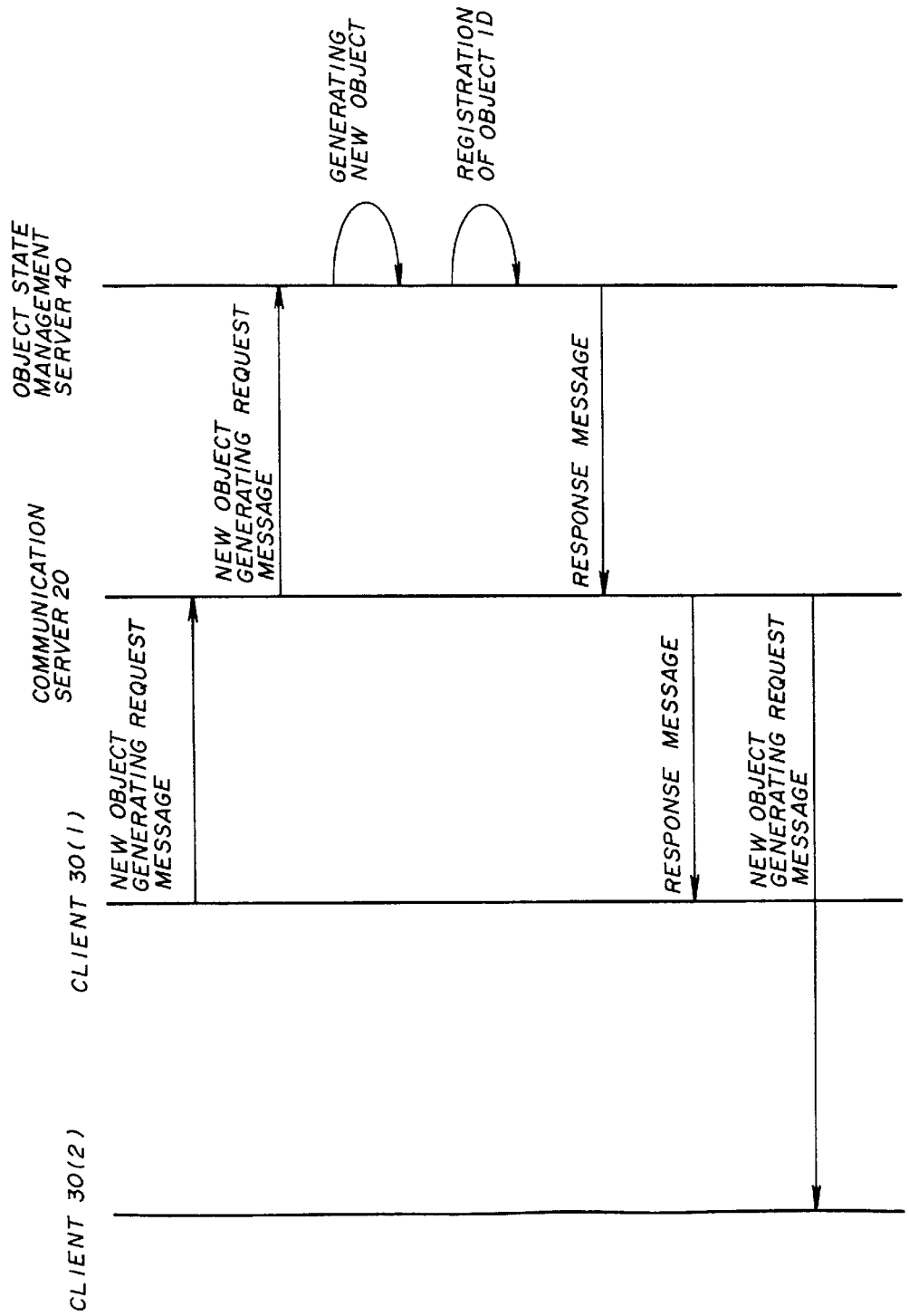
FIG. 16 is a flowchart illustrating a procedure of a process in the fourth example of the functional structure of the system.

In the system as described above, a new object is generated in a client 30(1), a process is executed in accordance with a procedure as shown in FIG. 16.

Referring to FIG. 16, an object generating request message is transmitted from the client 30(1) in which the new object is generated to the communication server 20. The object generating request message is formed of an object generating command ID number, an object name character string and an owner name character string (e.g., a name of the user generating the object). The communication server 20 forwards the received object generating request message to the object state management server 40.

Figure 15:
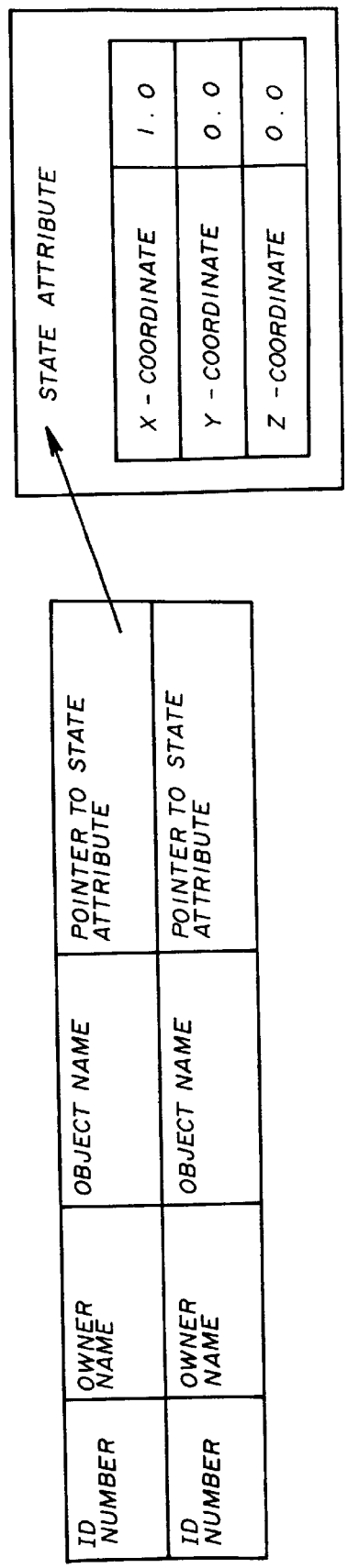
FIG. 15 is a diagram illustrating another example of the object state table.

When the object state management server 40 receives the object generating request message, the object ID generating unit 43 generates an object ID having the format as described above (see FIG. 14). The information regarding the new object is then recorded in the object state table 42. The object state table 42 is formed as shown in FIG. 15 (a) and (b). That is, an ID number, an owner name character string, an object name character string, a pointer value pointing a state attribute and a state attribute are described for each object.

When the recording of the new object is completed in the object state management server 40, the object state management server 40 transmits a response message to the communication server 20. The response message includes, for example, a response command ID and a new object ID number. The communication server 20 which receives the response message transmits the response message to the client 30(1) in which the new object is generated. The communication sever 20 further transmits the object generating request message to other clients which receives the information regarding the same virtual space as the client 30(1).

According to the above process, in the client 30(1) in which the new object is generated, an object ID number uniquely identifying the new object can be recognized. In each of the other clients sharing the virtual space, the new object is generated based on the object generating request message. Thus, in a case where a new object is generated in one of the clients sharing the virtual space, the same new object can be generated in each of the other clients sharing the virtual space.

For example, in the system in which a new object can be generated as described above, it is necessary to limit change of the state attribute of each object among the clients. A system in which the change of the state attribute of each object among the client is limited is formed as shown in FIG. 17.

Figure 17:
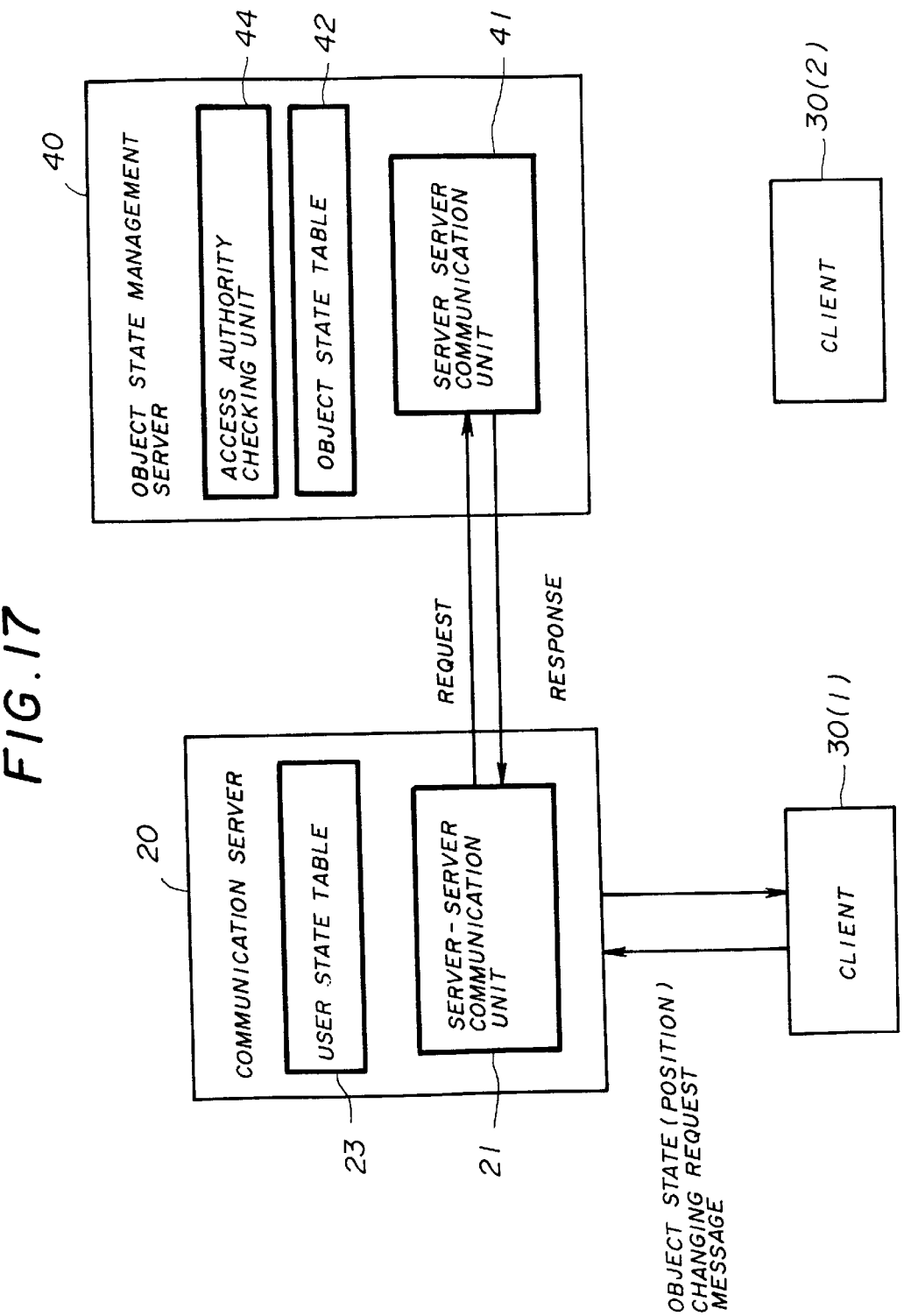
FIG. 17 is a block diagram illustrating a fifth example of the functional structure of the system shown in FIG. 3.

Referring to FIG. 17, the communication server 20 has the server-server communication unit 21 in the same manner as in the above case and further has a user information table 23. The object state management server 40 has the server-server communication unit 41 and the object state table 42 in the same manner as in the above case and further has an access authority checking unit 44.

The user information table 23 of the communication server 41 is provided, for example, with a "user ID number", a user character string and a client address as show in FIG. 18. The user ID number identifies a user. The client address identifies a client which is used by the user identified by the user ID number. The access authority checking unit 44 of the object state management server 40 checks whether the state of an object should be changed in response to the state changing request for the object.

Figure 19:
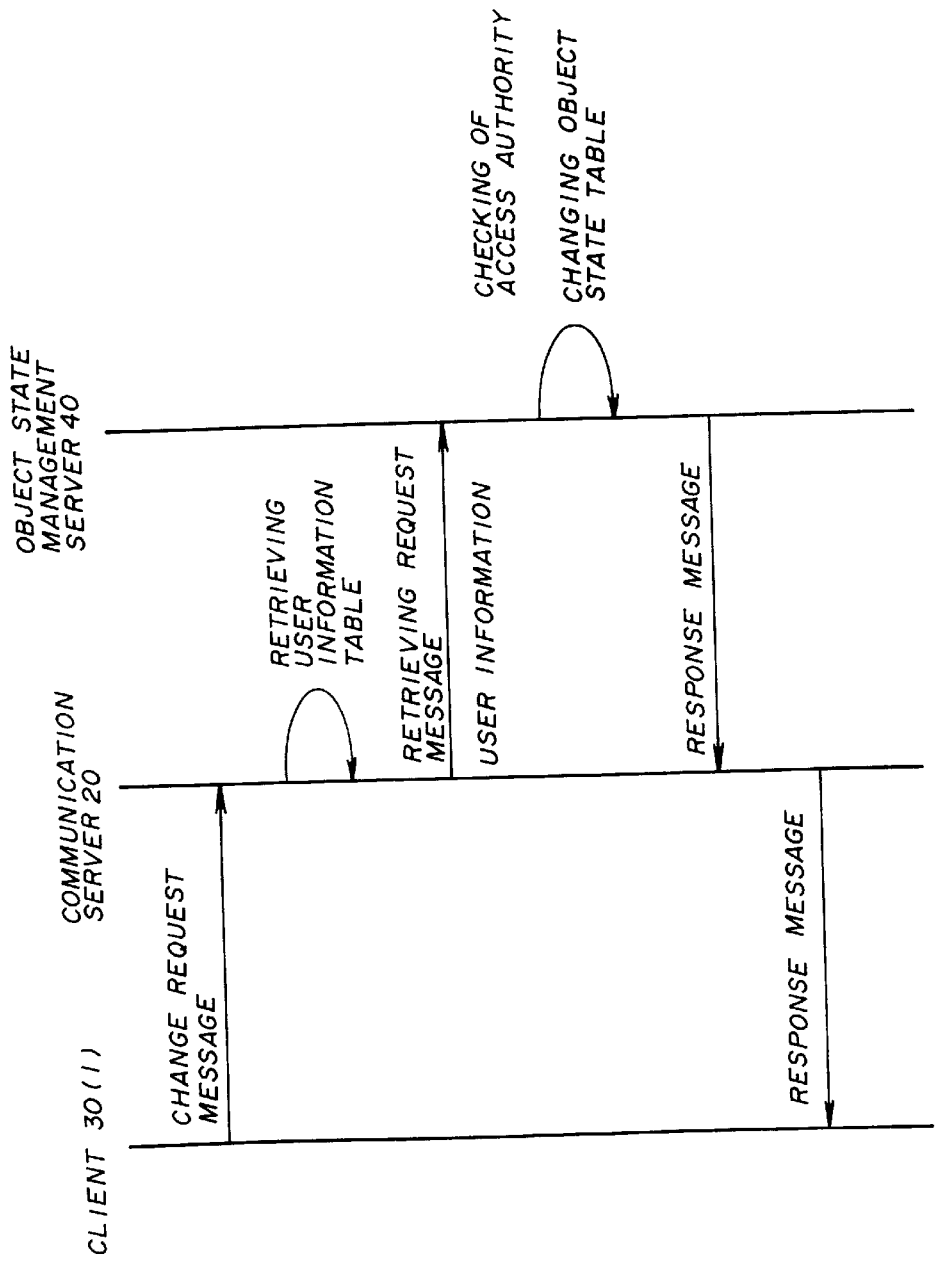
FIG. 19 is a flowchart illustrating a procedure of a process in the fifth example of the functional structure of the system.

In the system as described above, when a user of a client 30(1) carries out operations for changing the state attribute (the position) of an object in the virtual space, a process is executed in accordance with a procedure as shown in FIG. 19.

Referring to FIG. 19, a changing request message for changing the state of an object is transmitted from the client 30(1) to the communication server 20. The communication server 20 which receives the changing request message retrieves a user name character string according to the changing request message from the user information table 23. The user name character string (user information) obtained as a result of the retrieving process and the changing request message are then transmitted from the communication server 20 to the object state management server 40. Thus, in this case, a transmission message which is transmitted from the communication server 20 to the object state management server 40 includes a position change command ID number, a user name character string, an object name, an X coordinate value, a Y coordinate value and a Z coordinate value.

When the object state management server 40 receives the user information and the changing request message from the communication server 20, the access authority checking unit 43 determines, with reference to the object state table 42 (see FIG. 15), whether or not the user name character string is identical to the name of the owner of the object. If the user name is identical to the name of the owner of the object, the object state management server 40 updates the contents (the state attribute of the object) of the object state table 42 based on the changing request message and transmits a response message to the communication server 20. The response message includes a response command ID number and a result (a success ID number or a failure ID number) in the same manner as in the case shown in FIG. 11. On the other hand, if the received user name is not identical to the name of the owner of the object described in the object state table 42, a response message including a response command ID number and a failure ID number is transmitted from the object state management server 40 to the communication server 20.

The communication server which receives the response message as described above forwards the response message to the client 30(1) which is instructed to change the state of the object. In the client 30(1) which receives the response message, it can be recognized, based on the result (the success ID number or the fail ID number) included in the response message, that the state of the object is changed.

The present invention is not limited to the aforementioned embodiments, and other variations and modifications may be made without departing from the scope of the claimed invention.

What is claimed is:

1. A virtual space communication system, comprising:
    a virtual space management computer to manage information representing a virtual space that has objects with states;
    a plurality of client computers each to receive the information representing the virtual space from said virtual space management computer, and to generate change request messages representing client changes to the states of the objects in the information that the clients received from the management computer, each of said plurality of client computers having an object state changing means for changing the states of the objects in the information received from the virtual space management computer;
    a communication management computer to transfer, to both the clients and the virtual space management computer, the change request messages generated by the clients, where the communication management computer transfers responsive to receiving the messages from the clients; and
    changing means for changing the information managed by said virtual space management computer based on changes to the states of the objects,
    said virtual space management computer and said communication management computer being coupled via a network, so that the states of the objects managed at the virtual space management computer are changed by the changing means of the virtual space management computer responsive to and after said communication management computer receives the change request messages from the client computers and transfers them to said virtual space management computer.

2. The virtual communication system as claimed in claim 1, wherein said changing means has change informing means for informing said virtual space management computer of state change information indicating that a state of an object has been changed in one of said plurality of client computers, and virtual space changing means, provided in said virtual space management computer, for changing the information regarding the virtual space based on the state change information.

3. The virtual space communication system as claimed in claim 2, wherein said virtual space management computer has an object state table indicating states of respective objects forming the virtual space, and wherein said virtual space changing means has table rewriting means for rewriting the state of an object in said object state table based on the informed state change information.

4. The virtual space communication system as claimed in claim 1, wherein said means for managing the relationship between the plurality of objects and a plurality of management computers which manage virtual spaces is provided in said communication management computer, and wherein when said communication management computer receives from the one of said plurality of client computers information indicating that the state of the one client has been changed, said communication management computer informs said management computer, based on the relationship managed by said relationship management means, that the state of the one object has been changed.

5. The virtual space communication system as claimed in claim 1, wherein said changing means has change informing means for informing all client computers sharing the virtual space of the changed information when the information regarding the virtual space managed by said virtual space management computer is changed.

6. The virtual communication system as claimed in claim 1, further comprising:
    identification information generating means for generating identification information identifying an object upon generation in one of said plurality of client computers, the identification information being unique in said system.

7. The virtual space communication system as claimed in claim 1, further comprising:
    means for managing users having authorities based on which the respective objects forming the virtual space are changed; and
    means for determining whether a user of said one of said plurality of client computers is identical to a user who is managed by said managing means as a user having an authority of change of the one object when the one of said plurality of client computers requests such change,
    wherein when both the users are identical to each other, the information regarding the virtual space managed by said virtual space management computer is changed.

8. The method apparatus according to claim 1, wherein said communication computer distributes the information representing the change of the state of the object to said plurality of client computers after said management computer changes the state of the object according to the transferred object state change request message.

9. The apparatus according to claim 1, wherein the communication management computer is dedicated to communication management, and the communication management computer does not manage the virtual space.

10. The apparatus according to claim 1, wherein the states of the objects are not updated by the communication management server.

11. A virtual space communication system, comprising:
    a virtual space management computer to manage information indicating a state of a virtual space;
    a plurality of client computers each initiating a local state of the virtual space based on information received from said virtual space management computer wherein each of said plurality of client computers selectively changes a state of an object included in the local state of the virtual space and in response sends a corresponding update message to a communication management computer; and
    said communication management computer to intermediate communication between the client computers and the virtual space management computer by sending to the management computer the update message representing a change of the state of the object among said plurality of client computers,
    wherein the information managed by said virtual space management computer is dynamically changed in response to a changed state of the object in one of said plurality of client computers, and
    said communication management computer distributes the update message to said plurality of client computers excluding said one of said plurality of client computers, which update their local state of the virtual space according to the update message received from the communication management computer.

12. The virtual space communication system as claimed in claim 11, wherein said virtual space management computer has an object state table indicating states of respective objects forming the virtual space, and the state of a selected object in said object state table is re-written in response to a changed state of the selected object in one of said plurality of client computers.

13. A virtual space communication method, comprising:

managing information regarding a state of a virtual space at a management server;

receiving information from the management server by a plurality of client computers regarding the virtual space, by which the client computers establish a local state of the virtual space corresponding to the state of the virtual space at the management server;

generating communication information which is used in the virtual space, wherein one of said plurality of client computers selectively changes a state of an object included in its local state of the virtual space and sends a corresponding update message to a communication management computer; and intermediating communication, with the communication management computer, regarding the communication information and the update message representing a change of the state of the object among said plurality of client computers, wherein the information managed by said virtual space management computer is dynamically changed in response to receiving from the communication management computer the update message representing a changed state of the object in said one of said plurality of client computers, and said communication management computer distributes the update message representing the change of the state of the object to said plurality of client computers excluding said one of said plurality of client computers, where the plurality of client computers excluding said one of said plurality of client computers use the update message to synchronize their local state of the virtual space with the updated state of the virtual space at the management computer.

14. A virtual space communication system, comprising:

a virtual space management computer to manage information representing a virtual space that has objects with states;

a plurality of client computers each to receive the information representing the virtual space from said virtual space management computer, and to generate change request messages representing client changes to the states of the objects in the information that the clients received from the management computer, each of said plurality of client computers having an object state changing means for changing the states of the objects in the information received from the virtual space management computer;

a communication management computer to transfer, to both the clients and the virtual space management computer, the change request messages generated by the clients, where the communication management computer transfers responsive to receiving the messages from the clients; and changing means for dynamically changing the information managed by said virtual space management computer in response to receiving the change request messages, wherein said communication management computer distributes the change request messages representing the changes of the states of the object to both said virtual space management computer and to said plurality of client computers excluding said one of said plurality of client computers responsive to receiving the change request message.

15. The virtual space communication system according to claim 14, wherein the object data are distributed among the plurality of virtual space management computers.

16. The virtual space communication system according to claim 15, wherein the object data stored in the plurality of virtual space management computers are mutually different.

* * * * *